United States Patent [19]

Tsuji et al.

[11] Patent Number: 4,816,854
[45] Date of Patent: Mar. 28, 1989

[54] CLOSE-RANGE LIGHTING FLASH DEVICE

[75] Inventors: Kenji Tsuji; Tsutomu Ichikawa, both of Kashiwara; Hiroshi Hosomizu, Nara, all of Japan

[73] Assignee: Minolta Camera Kabushiki Kaisha, Osaka, Japan

[21] Appl. No.: 85,516

[22] Filed: Aug. 13, 1987

[30] Foreign Application Priority Data

| Aug. 13, 1986 | [JP] | Japan | 61-191122 |
| Sep. 29, 1986 | [JP] | Japan | 61-230777 |
| May 11, 1987 | [JP] | Japan | 62-113888 |
| May 11, 1987 | [JP] | Japan | 62-113889 |
| May 11, 1987 | [JP] | Japan | 62-113890 |
| May 13, 1987 | [JP] | Japan | 62-117563 |
| May 13, 1987 | [JP] | Japan | 62-117564 |
| May 13, 1987 | [JP] | Japan | 62-117565 |

[51] Int. Cl.⁴ .................... G03B 15/02; H05B 41/14
[52] U.S. Cl. .................... 354/413; 354/132; 362/17; 362/13; 315/241 P
[58] Field of Search ............... 354/413, 126, 129, 132, 354/145.1, 141; 362/3, 7, 11, 12, 13, 16, 17; 315/234, 240, 241 P, 324, 325

[56] References Cited

U.S. PATENT DOCUMENTS

| 3,474,242 | 10/1969 | Forrant | 362/17 X |
| 3,890,538 | 6/1975 | Iwata et al. | 354/145.1 X |
| 4,204,269 | 5/1980 | Plummer | 362/17 |
| 4,327,981 | 5/1982 | Luursema | 354/145.1 |

FOREIGN PATENT DOCUMENTS 60-39025  3/1985  Japan .

OTHER PUBLICATIONS

Minolta Manual, "Auto Electroflash Macro 80PX".

Primary Examiner—W. B. Perkey
Attorney, Agent, or Firm—Price, Gess & Ubell

[57] ABSTRACT

A close-range lighting flash device comprising an electronic flash unit including a plurality of xenon tubes, an illuminator unit provided integrally in the flash unit and including a plurality of illuminator lamps, a light-transmitting panel arranged in front of both of the xenon tubes and the illuminator lamps, and a control device for energizing the illuminator unit. The light-transmitting panel has first and second portions aligned respectively with the xenon tubes and the illuminator lamps, the second portions having a light diffusing density smaller than that of the first portions.

15 Claims, 11 Drawing Sheets

CLOSE-RANGE LIGHTING FLASH DEVICE

BACKGROUND OF THE INVENTION

1. Field of the Invention

The present invention generally relates to a close-range lighting flash device or macro flash device for use in close-up photography and photomacrography and, more particularly, to a photographic ringflash device including a plurality of xenon tubes capable of being selectively fired.

2. Description of the Prior Art

In close-up photography and photomacrography, the macro flash device wherein the macro flash unit capable of selectively firing a plurality of xenon tubes is mounted over the lens at the front end thereof, and a switch for the selection of the xenon tubes has hitherto been provided on the back face of the macro flash unit mounted on the lens assembly. In such a case, since the lens assembly is brought close to the subject and is, because of the macro flash unit mounted thereon, instable with respect to the center of gravity, the lens assembly tends to be unnecessarily moved during the manipulation of the switch with the focusing and the framing changed consequently, requiring the focusing and the framing to be re-adjusted.

SUMMARY OF THE INVENTION

The present invention has been devised with a view to substantially eliminating the above discussed problems and has for its essential object to provide an improved close-range lighting flash device effective to permit the quick and easy focusing, framing of the image of the subject when selecting the xenon tubes even though the latter is located the closest available distance away from the camera system.

Another important object of the present invention is to provide an improved close-range lighting flash device of the type referred to above, which is simple in construction and easy to operate when selectively firing the xenon tubes.

In order to accomplish the above described objects of the present invention, the macro flash device is separated into a macro flash unit adapted to be mounted over the lens assembly, a control main body adapted to be mounted onto a hot shoe of the camera body and also capable of normal flash, a cable section for electrically connecting them together, and a switch, for the selective firing of the xenon tubes being disposed on the control main body. The power source can be positioned only in the main body. With this construction, the manipulation of the switch for the selective firing of the xenon tubes is carried on the side of the control main body on the hot shoe of the camera body, not at the front end of the lens assembly, and, therefore, any possible change of the focus and the framing which would occur during the manipulation of the switch can be substantially avoided.

The invention further includes diffusion panels for the macro flash unit and a multiple trigger capacitor selector circuit that can be activated from the control main body.

BRIEF DESCRIPTION OF THE DRAWINGS

These and other objects and features of the present invention will become clear from the subsequent detailed description thereof taken in conjunction with preferred embodiments thereof with reference to the accompanying drawings, in which.

DETAILED DESCRIPTION OF THE EMBODIMENTS

Figure 1:
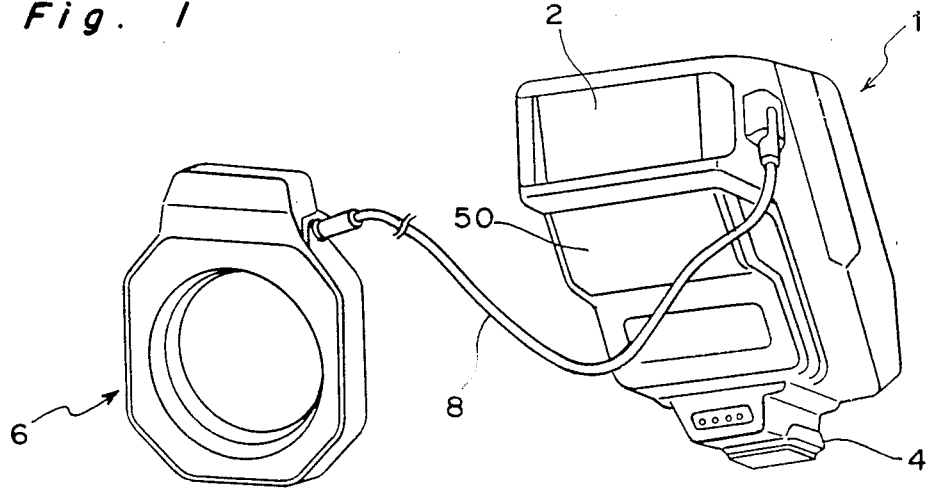
FIG. 1 is a perspective view showing an example of close-range lighting flash device utilizable in the practice of the present invention.
Figure 2:
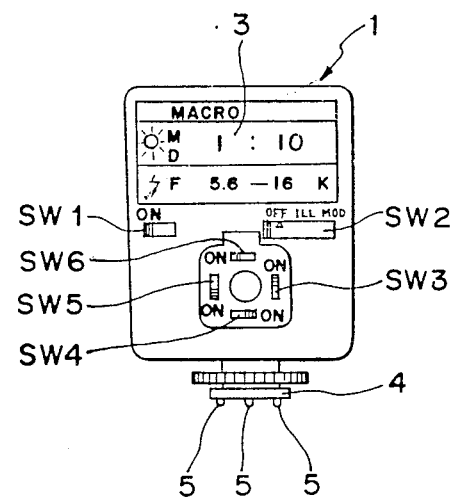
FIG. 2 is an elevational view showing the back of a main body of the flash device.

Referring first to FIG. 1, reference numeral 1 represents a flash main body adapted to be detachably mounted on a camera body (not shown). The flash main body 1 is provided at its front with a flash emitting window 2 and an auxiliary light emitting window 50 for focus detection purpose and also provided at its back with a display window 3 and a plurality of switches SW1 to SW6 as shown in FIG. 2.

The flash main body 1 has a mounting leg 4 carrying a plurality of terminal pins 5 which are, when the flash main body 1 is mounted on the camera body, electrically connected with corresponding terminals on the camera body for the transmission of data signals between the flash main body 1 and the camera body.

Reference numeral 6 represents a close-range flash unit or a macro lighting unit designed to fit around a camera lens at the front end thereof (not shown), which flash unit 6 has a mounting opening defined therein so as to fit over the camera lens and is provided with four, generally elongated xenon tubes Xe2 to Xe5 arranged so as to surround the mounting opening, and four illuminator lamps LA1 to LA4 each positioned at a respective corner portion and between the neighboring xenon tubes.

The auxiliary light emitting window 50 includes a light emitting diode for emitting an auxiliary light for eventually accomplishing an automatic focus adjustment.

Figure 3:
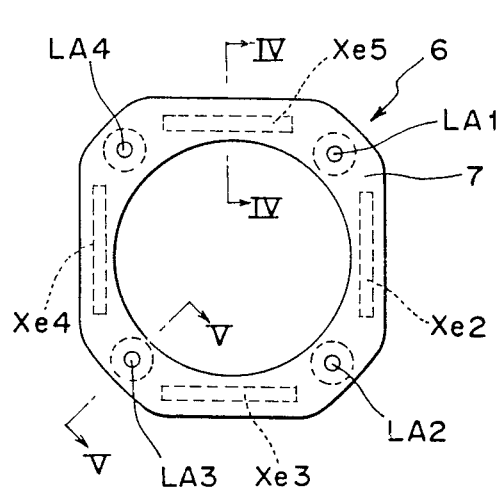
FIG. 3 is a front elevational view of a panel of a macro lighting unit.
Figure 4:
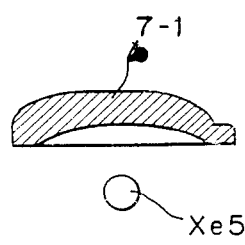
FIGS. 4 and 5 are cross sectional views taken along the lines IV—IV and V—V in FIG. 3, respectively.
Figure 5:
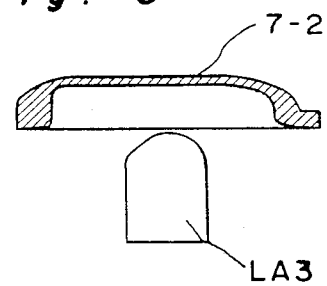

Referring to FIGS. 3 to 5, the close-range flash unit 6 includes a front panel 7 of one-piece construction having first panel portions, defined in front of the respective xenon tubes Xe2 to Xe5, and generally identified by 7-1, and second panel portions defined in front of the respective illuminator lamps LA1 to LA4 and generally identified by 7-2. Each of the first panel portions 7-1 has a thickness of about 2 mm as best shown in FIG. 4, and each of the second panel portions 7-2 is made of the same material as that of the first panel portions for facilitating the transmission of light there-through and is made to have a thickness of 0.5 mm as best shown in FIG. 5.

The close-range flash unit 6 is connected through a cable 8 and a connector 8a with predetermined terminals t1 to t10 (shown in FIG. 8) provided in the flash main body 1. As will be described later, by selecting the selector switches SW3 to SW6, the associated xenon tubes Xe2 to Xe5 as well as the associated illuminator lamps LA1 to LA4 can be selectively operated so that a subject to be photographed can be sufficiently illuminated during close-up photography or photomacrography.

Since each of the second panel portions 7-2 of the front panel 1 aligned with the illuminator lamps LA1 to LA4 is 0.5 mm in thickness which is smaller than the thickness of 2 mm of each of the first panel portions 7-1 aligned with the xenon tubes Xe2 to Xe5, the subject can be sufficiently illuminated by rays of light emerging from the illuminator lamps.

It is to be noted that the front panel may comprise first panel members, each made of a material having a predetermined diffusion density and positioned in front of the associated xenon tube, and second panel members each made of a material having a diffusion density smaller than that of the material for the first panel members and positioned in front of the associated illuminator lamp, said first and second panel members being integrally connected together. In such case, it is not essential for the first and second panel members to have different thicknesses. Also, the first and second panel members may be integrally formed by means of two-component molding.

Hereinafter, the feature of the present invention, together with other features, will be described in detail with reference to the preferred embodiment shown in the accompanying drawings.

Figure 6:
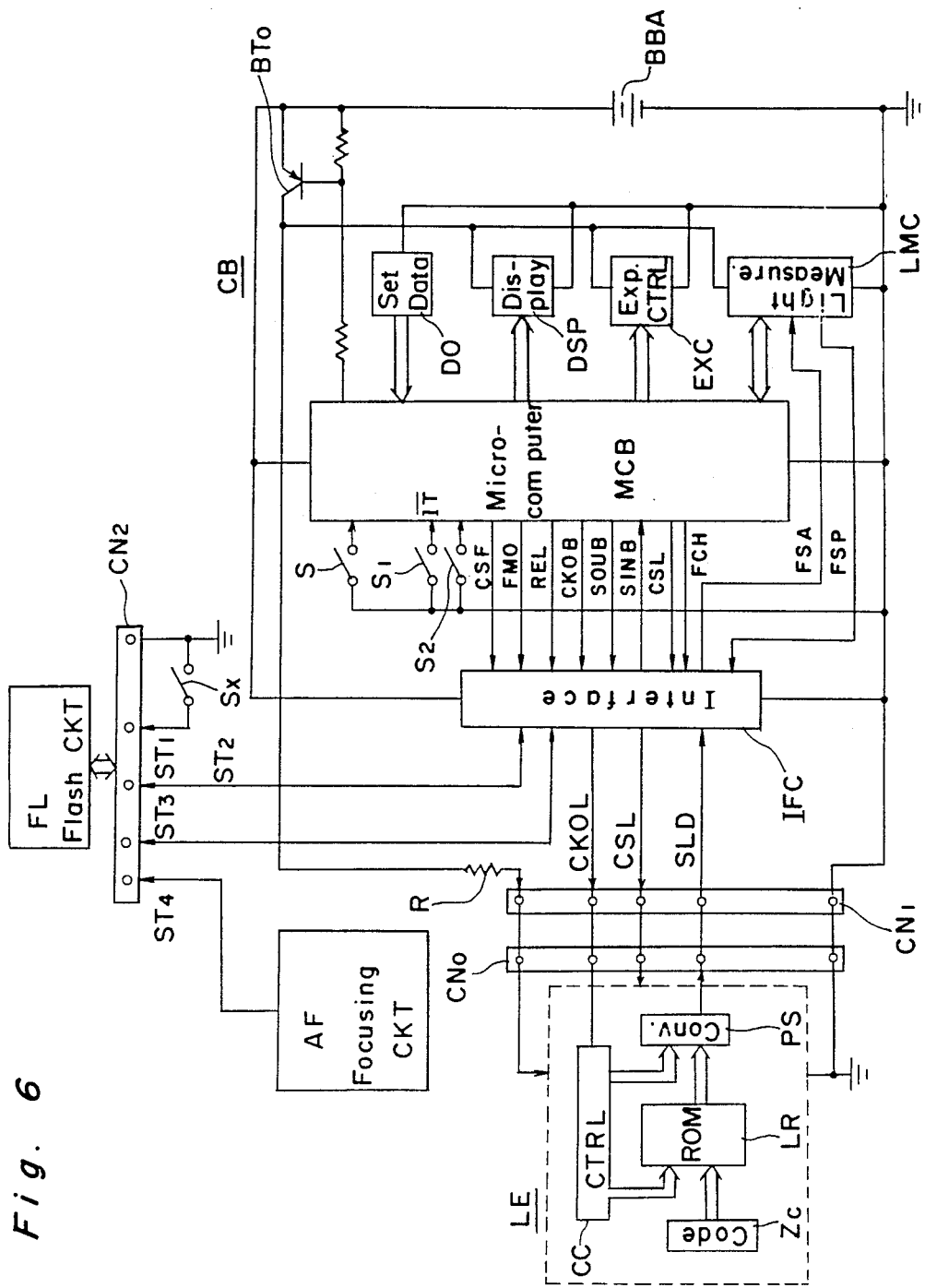
FIG. 6 is a block circuit diagram of a camera system used in the flash device according to the present invention.

Referring to FIG. 6 illustrating the electric circuit of a camera system to which the embodiment of the present invention is applicable, the circuit shown therein includes a camera circuit CB provided in the camera body, a lens circuit LE provided in an interchangeable lens assembly, for example, a zoom lens assembly having a macrophotographing capability, adapted to be mounted on the camera body, and a flash circuit FL used in the flash device shown in FIG. 1, it being to be noted that the details of the flash circuit FL are best shown in FIG. 8. The lens circuit LE and the camera circuit CB are electrically connected together by means of respective connectors CN0 and CN1, and the flash circuit F1 and the camera circuit CB are connected together by means of respective connectors CN2 and CN3 so that the both can operate in association with each other.

Figure 7:
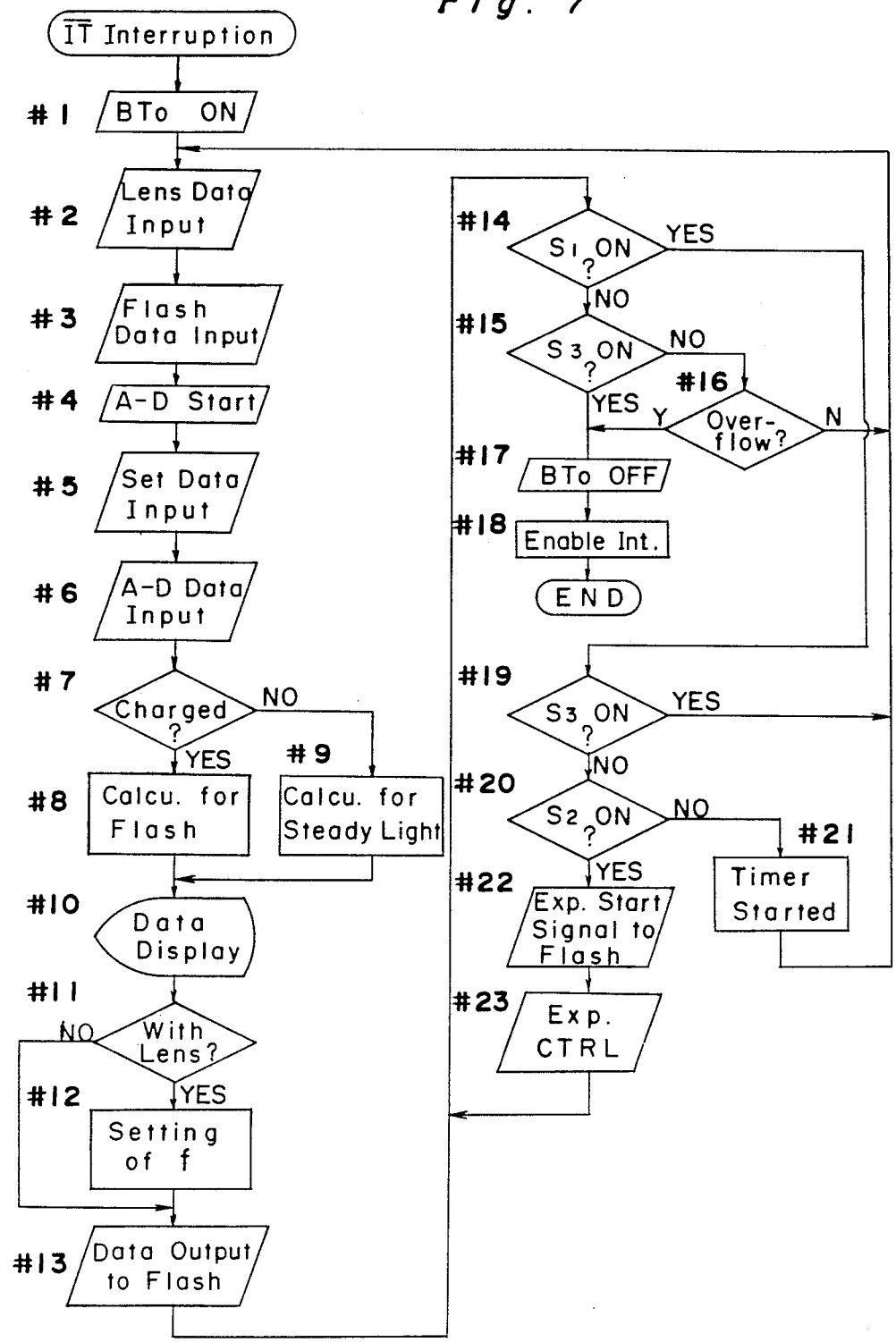
FIG. 7 is a flowchart showing the sequence of operation of the system of FIG. 6.

FIG. 7 illustrates the flowchart showing the sequence of operation of a microcomputer MCB which performs a prime role in the control operation of the camera circuit CB. It is to be noted that, in the following description made with reference to FIGS. 6 and 7 nomenclatures of signal lines are concurrently used to designate nomenclatures of associated input and output terminals for the signals for the sake of brevity.

In the camera circuit CB shown in FIG. 6, when a release button is depressed halfway accompanied by the closure of a light measuring switch S1, an interruption terminal IT of the microcomputer MCB is rendered to be in a low level state and the microcomputer MCB starts the program flow shown in FIG. 7. Referring to FIG. 7, and at step #1, a transistor BTo is caused to conduct so that an electric power can be supplied to the lens circuit LE through a protective resistor R and also to a display circuit DSP, an exposure control circuit EXC and a light measurement circuit LMC all included in the camera circuit CB.

At the subsequent step, the microcomputer MCB are up-loaded with data from the lens circuit LE. At the outset, a terminal CSL of an interface circuit IFC is rendered to be in a high level state so that the interface circuit IFC can perform a serial inputting operation, followed by the outputting of a byte of clocks (8 clocks) to a terminal CKOB. Since the terminal CSL of the interface circuit IFC is in the high level state, the lens circuit LE is active and, accordingly, parallel data are read out from a read-only memory (ROM) LR through a control circuit CC based on clocks fed from a terminal CKOL through the terminal CKOB. The parallel data are outputted to a terminal SLD after having been converted into serial data by a parallel-serial converter PS and are then applied to a serial input terminal SINB of the microcomputer MCB through the interface circuit IFC. The microcomputer MCB then stores this one byte data in a predetermined storage unit built in the microcomputer MCB.

On the other hand, in the lens circuit LE, each time one byte data is outputted, the control circuit CC continues to update and read out addresses of the ROM LR. When data which vary with the zooming operation of a zoom lens assembly are to be read, the address of the ROM LR can be specified by the data from the control circuit CC in combination with code data outputted from a code plate ZC associated with the amount of extension of the macro lens assembly. The data read out onto the camera side in this way include, in the case of the zoom lens assembly, data of the maximum aperture value, the minimum aperture value, the amount of change in aperture resulting from the zooming, the focal length of the lens assembly, and a check data resulting from the detection of whether or not the lens assembly has been mounted. In the case of the macro lens assembly, the data read out from the ROM also include data of the mounting of the macro lens assembly and the magnification.

When the data are read out from the lens circuit LE, the microcomputer, at step #3, reads data from the flash circuit FL. At this time, the terminal CSL is rendered to be in a low level state, a terminal CSF is rendered to be in a high level state and a high level pulse having a time width To is outputted from a terminal FMO. This pulse is in turn applied to the flash circuit FL from the interface circuit IFC through a terminal ST3. When this signal ST3 is so inputted, a flash control circuit FCC shown in FIG. 2 is brought in a condition ready to output data with the consequence that a high level pulse is outputted from a terminal CON, with which a microcomputer MCF in the flash circuit FL is, if it stops its operation, operated.

Then, the microcomputer MCB in the camera causes a terminal FCH to be in a high level state to permit the interface circuit IFC to perform the serial inputting operation, and, when clocks are applied to the flash circuit FL through the terminal ST3, a byte of data is outputted from the flash circuit FL to a terminal ST2 in synchronism with the clocks so applied. This serial data are read by the microcomputer MCB from the interface circuit IFC through the serial input terminal SINB. The data so read by the microcomputer MCB as described above include, for example, data descriptive of the status of the main switch SW1 for the control of the electric power supply to the flash device, data descriptive of whether or not the charging of the flash device has been completed, and data concerning FDC as will be described later. A signal indicative of the completion of charging is outputted from a charge monitoring circuit COC, when the voltage charged on a main capacitor MC of the flash device has attained a value higher than a predetermined value, and is inputted to both of the control circuit FCC and the microcomputer MCF. It is to be noted that the detection is imparted with hysteresis. Also, when a firing stop signal is inputted from the camera circuit CB within a predetermined length of time subsequent to the firing of the xenon tubes, an FDC signal indicative of the attainment of proper flash light control is outputted. When the up-loading of the initial data associated with the flash device have been completely performed, the actual operation starting from step #4 et seq. is executed. At the outset, at step #4, both of the terminals CSF and FCH are rendered to be in a low level state to initiate the operation of an analog-to-digital converter built in the light measuring circuit LMC. Then, data such as the exposure control mode, the exposure time, the aperture value, the ISO sensitivity and others are inputted from a data output circuit DO to the microcomputer MCB, followed by the inputting of data from the light measuring circuit LMC which have been analog-to-digital converted.

The light measuring circuit LMC includes a steady light measuring unit, an analog-to-digital converter of a steady light measurement output, and a flash light measuring unit, which flash light measuring unit, when a terminal FSA is rendered to be in a low level state, starts integration of measured light values and outputs a high level pulse to a terminal FSP for stopping the firing when the integrated value of the measured light outputs attains a value corresponding to the ISO sensitivity.

When the up-loading of the A-D converted data has been completed at step #6, a decision is made at step #7 on the basis of data from the flash device to determine if the flash device has been completely charged. If the flash device has been completely charged, a calculation for the flash photography is performed at step #8, but if the flash device has not been charged, a calculation for photography under steady lighting is performed at step #9. Then, at step #10, control values so calculated and the exposure control mode are displayed at a display unit DSP, followed by a decision at step #11 to determine, on the basis of the check data, if an interchangeable lens assembly is mounted. If the lens assembly has been mounted, the focal length f having been read is updated, but if the lens assembly has not yet been mounted, the program flow proceeds immediately to step #13 at which data are sent to the flash circuit FL.

The transfer of the data is carried out by rendering the terminal CSF to be in a high level state, outputting the high level pulse having the time width T1 to the terminal FMO, and inputting the data from the interface circuit IFC to the terminal ST3. The flash control circuit FCC when receiving this pulse outputs a pulse from a terminal TIN to permit the microcomputer MCF to be ready to receive inputs, also to permit a clock to be outputted from the terminal ST3 to a terminal SCK and further to permit data to be outputted from the terminal ST2 to a terminal SINF. The microcomputer MCB in the camera serially outputs a byte of data of each of the control aperture value, the exposure control mode and the ISO sensitivity, the focal length f, the mounting of the macro lens assembly and the magnification while the terminals CSF and FCH remain in the high level state and in the low level state, respectively. However, where the lens assembly is not the macro lens assembly, none of the signal indicative of the mounting of the macro lens assembly and the signal indicative of the magnification is outputted. The interface circuit IFC applies the clocks to the terminal ST3 and the data to the terminal ST2, those data being subsequently loaded in the microcomputer MCF in the flash device.

After the completion of the above described operation, and at step #14, a decision is made to determine if a light measuring switch S1 remains closed, and if it is closed, the program flow proceeds to step #19. At step #19, a decision is made to determine the status of a reset switch S3 which closes and opens when an exposure control operation has completed and when an exposure control mechanism has been completely charged, respectively. Should this reset switch S3 have been closed, it means that the charging of the exposure control mechanism has not been completed and, therefore, without a decision being made to determine the status of the release switch S2 (at step #20), the program flow returns to step #1 to repeat the next cycle of operation similar to the previous cycle as hereinabove described.

On the other hand, if the charging has been completed and the reset switch S3 is opened, a decision is made to determine if a release switch S2 adapted to be closed when the release button is subsequently depressed all the way is closed. Should the result of decision indicate that the release switch S2 has not yet been closed, the program flow returns to step #2 after the counting from an initial value of a timer for holding the electric power source has been initiated at step #21.

Should the release switch S2 have been determined as closed at step #20, an exposure start signal is supplied to the flash circuit FL at step #22. By this operation, the terminal CSF is rendered to be in a high level state, and a high level pulse having a time width T2 is outputted to a terminal FMO. This high level pulse is inputted to the flash control circuit FCC through the terminal ST3 whereby in response to this signal the flash control circuit FCC resets the FDC signal and renders a RE terminal to be in a low level state, thereby assuming a condition ready to fire. Then, the microcomputer MCB renders terminals CSF and REL to be in low and high level states, respectively, to initiate the exposure control operation performed by the exposure control circuit EXC. Since at this time the terminal REL is in the high level state, the interface circuit IFC outputs a signal, which is inputted from the flash device through the terminal ST2, and a signal from a terminal FSP to a terminal FSA and the terminal ST3, respectively.

Although during a period in which no data transmission takes place the flash control circuit FCC outputs the high level signal, if the charging has been completed, or the low level signal, if the charging has not yet been completed, to the terminal ST2, the terminal ST2 if in the high level state is switched over to a low level state when a closure signal of an X contact Sx is applied thereto through the terminal ST1. The interface circuit IFC applies the signal from the terminal ST2 to a terminal FSA in view of the fact that the terminal REL is rendered to be in a high level state, and the light measuring circuit LMC starts integration in response to the fall of the signal from the terminal FSA.

Figure 8A:
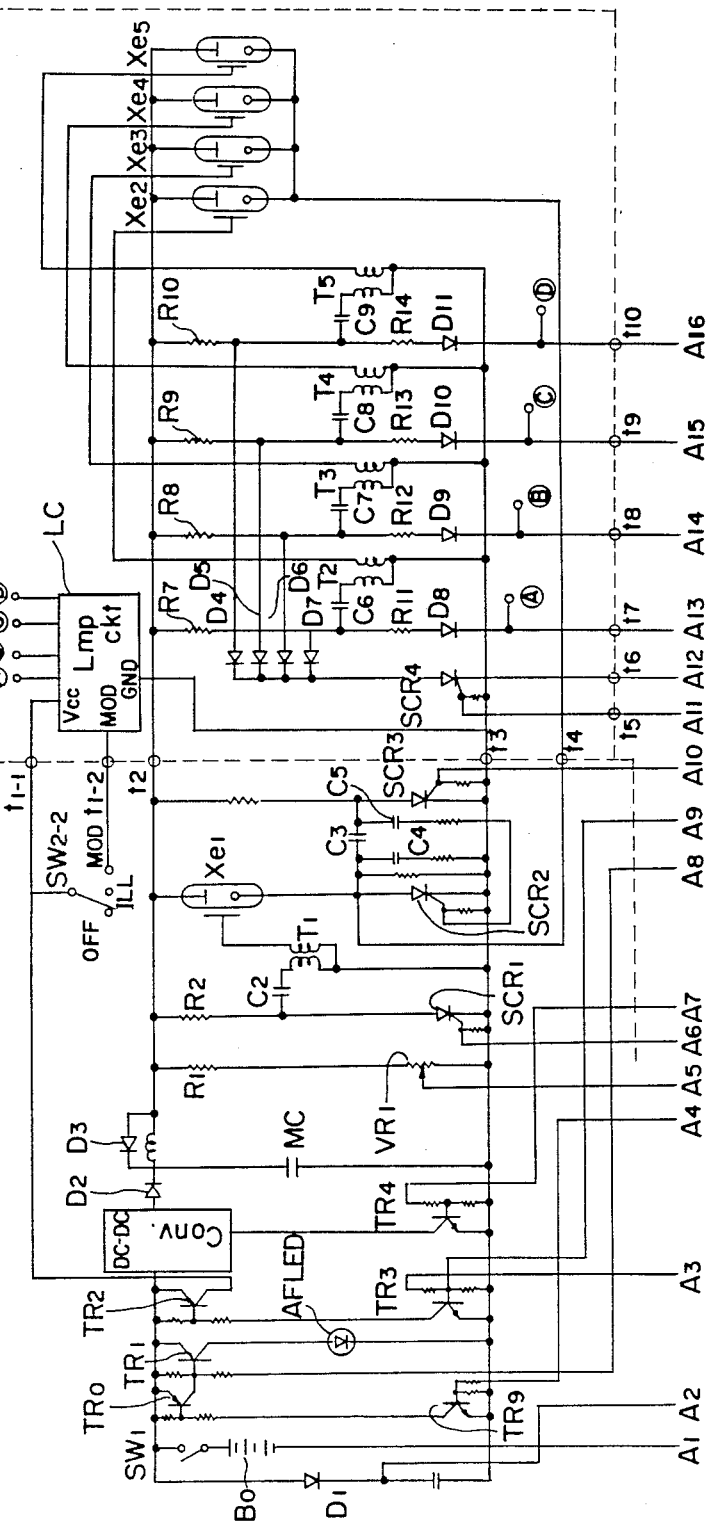
FIG. 8 comprised of FIGS. 8($a$) and 8($b$) is a circuit diagram showing an electric circuit used in the flash device.

On the other hand, the flash control circuit FCC, when the closure signal of the X contact Sx is applied thereto, outputs a low level signal to a terminal TR, if the charging has been completed, to switch a transistor TR6 on. At this time, if a macro firing unit 6 is mounted to the flash main body 1 as will be described later, the xenon tubes Xe2 to Xe5 are selectively fired, but if it is not mounted, a xenon tube Xe1 is fired. When the integrated value based on the integration performed by the light measuring circuit LMC attains a predetermined value, a firing stop signal is outputted to the terminal FSP and is in turn inputted to the flash control circuit FCC through the interface circuit IFC and the terminal ST2. The flash control circuit FCC, when applied with the firing stop signal within a predetermined time subsequent to the closure of the X contact Sx, outputs this signal to a terminal STOP and, at the same time, memorizes the fact that the firing stop signal has been outputted. On the other hand, a thyristor SCR3 shown in FIG. 8, particularly in FIG. 8(a), is operated in response to the firing stop signal applied from the terminal STOP, causing a thyristor SCR2 to be brought in a non-conducting state to cease the firing of the xenon tubes Xe1 to Xe5. Also, the flash control circuit FCC renders the terminal RE to be in a high level state in light of the fact that the X contact Sx has been opened upon the completion of the exposure control operation.

The foregoing exposure control operation is executed at step #23 and, upon the completion of this step #23, the microcomputer MCB returns to step #14. Here a decision is again made to determine if the light measuring switch Sl is closed. If it is closed, the program flow returns to step #2 by way of step #19. On the other hand, if the switch Sl is opened, and since the switch S3 is closed, the transistor BTo is switched off at step #17 and interruption to the terminal IT is enabled at step #18, thereby completing the cycle of operation.

On the other hand, when the light measuring switch Sl is opened while the exposure control mechanism has been charged and the reset switch S3 has been opened, a decision is made at step #16 to determine if the timer has overflowed (for example, 10 seconds has been passed subsequent to the timer start). If it is overflowed, the operation terminates, but if it is not overflowed, the program flows from step #2 to step #16 through step #13 is repeated.

Reference character AF represents a focusing circuit including a focus detection circuit and a lens drive circuit, which circuit AF causes a terminal ST4 to be in a low level state when the subject to be photographed is dark and has low contrast.

Figure 8B:
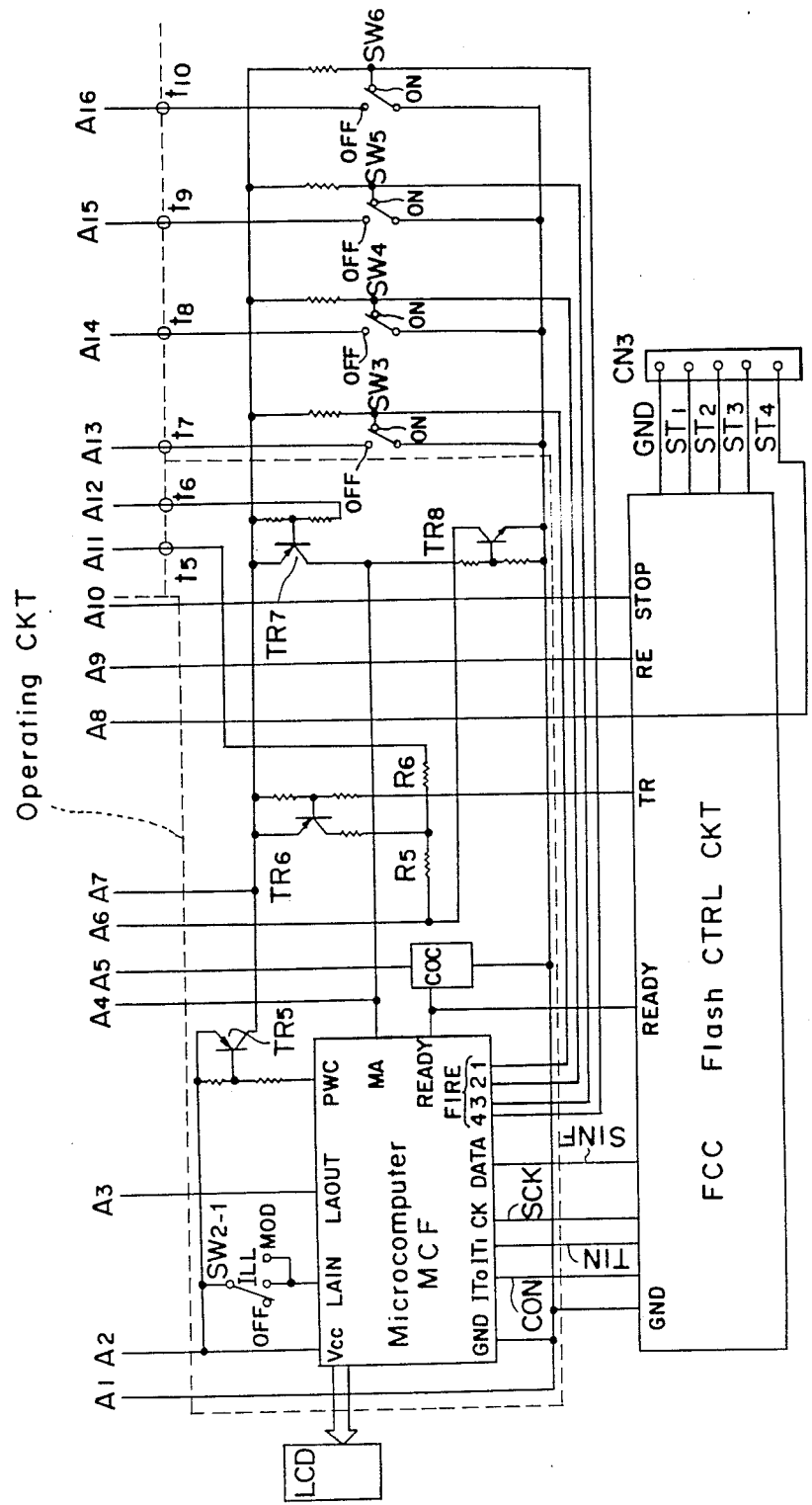
Figure 9:
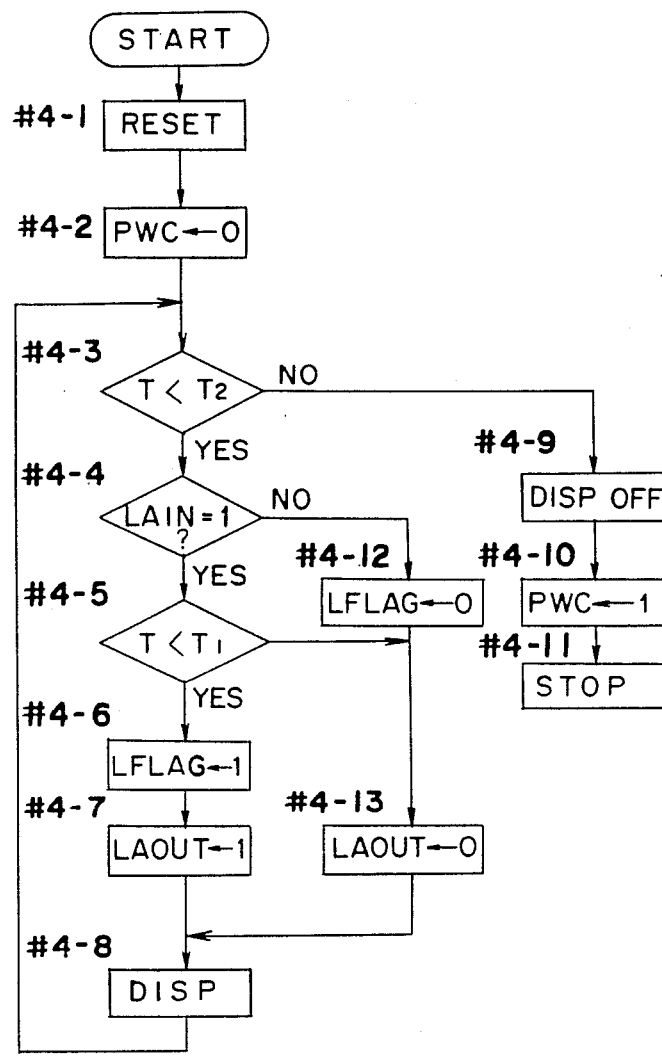
FIGS. 9 to 15 are flowcharts showing the sequence of operation of the circuit shown in FIG. 8.
Figure 10:
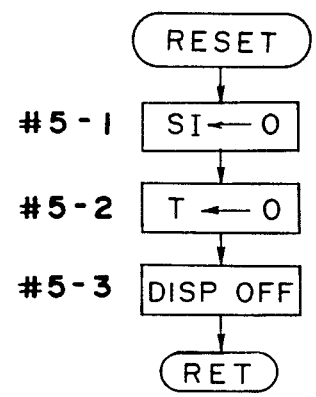

FIGS. 9 to 15 illustrate flowcharts showing the sequence of operation of the microcomputer MCF used in the flash circuit FL as shown in FIG. 8, The circuit construction shown in FIG. 8 and its operation will be described with reference to the flowcharts shown in FIGS. 9 to 15. When the main switch SW1 shown in FIG. 8(a) is closed, electric power is supplied from a battery Ba to the microcomputer MCF through a diode D1 thereby to cause the microcomputer MCF to start its operation. At step #4-1, initialization is carried out. A routine for this initialization is shown in FIG. 10, wherein a flag SI adapted to be set to 1 when an interrogation with the camera has been carried out is reset at step #5-1, a register T for counting the time passed is rendered to be 0 at step #5-2, and the display of a display device LCD is turned off at step #5-2.

Figure 11:
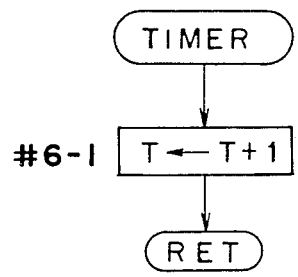
Figure 12:
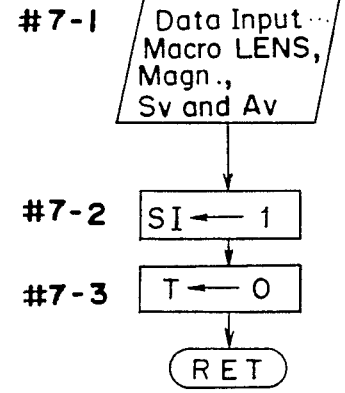

FIG. 11 illustrates a timer interruption routine. The microcomputer MCF is provided with a circuit for counting the time independently of the flow of the program and interruption is effected each second. When this interruption is effected, the register T for counting the time passed is incremented by one. FIG. 12 illustrates a routine for the transmission of signals with the camera. When the data are transmitted from the camera as hereinbefore described, and when a terminal IT1 is rendered to be in a high level state, the microcomputer MCF interrupts the flow of the program halfway and runs such a routine as shown in FIG. 12. At step #7-1, the data from the camera, that is, such data as the ISO sensitivity Sv, the preset aperture value Av, the macro lens mounting signal and a data of magnification M of the macro lens assembly are inputted to the microcomputer MCF. At step #7-2, the flag SI is set to indicate that the communication with the camera has been carried out, followed by the resetting of the register T at step #7-3. Thus, the counting of the time passed is not carried out during a period in which the data are inputted from the camera.

When a terminal PWC of the microcomputer MCF is rendered to be in a low level state at step #4-2, a transistor TR5 is switched on with the consequence that an operating circuit is electrically powered. At step #4-3, a comparison is made between the time T passed and a predetermined time T2, said predetermined time T2 being a time required for the flash device to cease its operation. If the time T is smaller than the time T2, the program flow proceeds to step #4-4 at which a decision is made to determine if a switch SW2 comprising switches SW2-1 and SW-2 for lighting lamps are closed. When switches SW2-1 and SW2-2 are switched to respective positions other than OFF positions, that is, to either ILL or MOD positions (which positions are hereinafter referred to as ON positions), a terminal LAIN is rendered to be in a high level state, with the program flow proceeding to step #4-5 at which a predetermined time T1 required for the illuminator lamps to be turned off is compared with time T passed. If the time T is smaller than the predetermined time T1, a flag LFLAG is set at step #4-6 to show that the switch SW2 for turning on the lamps is in an on ON state and at the subsequent step #4-7 a terminal LAOUT is rendered to be in a high level state. In this way, transistors TR3 and TR2 are switched on to permit an electric power source Vcc to be fed to a terminal t1-1 of a macro firing circuit ML so that some or all of the lamps can be lit by a lamp control circuit LC as will be described later. During the release of the camera, the terminal RE of the flash control circuit FCC is rendered to be in the low level state as hereinbefore described and, therefore, the transistor TR3 is switched off with lamps consequently turned off. Thus, during the exposure performed by the camera, the lamps are essentially turned off and, therefore, no lamp participates in the exposure.

At step #4-8, a display routine as will be described later is executed.

Where the result of decision at step #4-3 indicates that the time T2 is equal to or smaller than the time T, the program flow proceeds to step #4-9 at which the display is turned off. At the subsequent step #4-10, the terminal PWC is rendered to be in a high level state. Therefore, a transistor TR5 is switched off, and an electric power source for both of the flash control circuit FCC and a DC-to-DC converter is turned off to minimize the waste of the battery Ba. At step #4-11, the microcomputer MCF enters in a mode for minimizing the waste of the battery, which mode is hereinafter referred to as STOP mode. When the terminal ITo of the microcomputer MCF is rendered to be in a high level state during the STOP mode, the microcomputer MCF escapes from the STOP mode and executes step #4-1. When at step #4-4 the lamp switch SW2 is not in the ON position, that is, is in the OFF position, the program flow proceeds to step #4-12 at which a flag LFLAG is reset to show that the lamp switch SW2 is in the OFF position. Where the time T1 is equal to or smaller than the time T at step #4-5, the program flow proceeds to step #4-13 to render the terminal LAOUT to be in a low level state with the lamp turned off. In other words, when the lamp switch SW2 is in the ON position subsequent to the closure of the switch SW1, the lamp is lit for the predetermined time T1 and the circuit power source is automatically turned off after the passage of the predetermined time T2. Also, during the signal communication with the camera taking place, this time remains zero and is substantially extended, and only when the signal communication with the camera is interrupted, the lamp and the circuit power source are turned off respectively after the passage of the predetermined times T1 and T2. This is because, since the lamp consumes a relatively large amount of electric power, the lamp is automatically turned off quickly when it is not used, thereby to avoid any possible waste of the battery.

The operation of the flash device taking place subsequent to the closure of the X contact Sx in the camera will be described with particular reference to FIG. 8.

So long as the close-range or macro flash unit 6 is not mounted on the flash main body 1, the base of a transistor TR7 is opened and the transistor TR7 is accordingly switched off. In this condition, a terminal MA of the microcomputer MCF is in a low level state. Should a main capacitor MC in the flash main body 1 have been charged, the flash control circuit FCC causes a terminal TR to be in a low level state when a signal ST1 indicative of the closure of the X contact i inputted thereto. Thereby, a transistor TR6 is switched on to apply a trigger signal to the gate of a thyristor SCR1 through a resistor R5. In response to the trigger signal, the thyristor SCR1 is triggered on to cause a trigger circuit, comprised of a resistor R2, a capacitor C2 and a transformer T1, to trigger the xenon tube Xe1 with the consequence that the xenon tube Xe1 is fired.

On the other hand, if the macro flash unit 6 has been mounted on the flash main body 6, a terminal t6 is rendered to be GND and, therefore, the transistor TR7 is switched on with the terminal MA rendered to be in a high level state. In view of the transistor Tr7 having been switched on, the transistor TR1 will not be switched on and AFLED will not be lit even when both the transistors TR9 and TR10 are switched on and the terminal ST4 is rendered to be in a low level state. This is because during the photomacrography a light emitting diode for AF purpose is automatically turned off to avoid an unnecessary consumption of electric current in view of the fact that, since during the photomacrography the camera-to-subject distance is very small and even though AFLED built in the flash main body 1 is lit, an illuminating light from the AFLED will not properly reach the subject because of parallax resulting from deviation in optical axis between the camera and the flash device.

When the transistor TR7 is switched on, the transistor TR8 is brought in a condition ready to be switched on. When the transistor TR6 is at this time switched on, the thyristor SCR1 is not fired because the gate thereof falls to GND, and on the other hand, a thyristor SCR4 is fired through a resistor R6. Thus, when and so long as the macro flash unit has been mounted, the firing of a flash unit in the main body is automatically inhibited.

In FIG. 8(b), the selector switches SW3 to SW6 in the flash main body are engaged to respective ON positions, and, in this condition, trigger capacitors C6, C7, C8 and C9 are discharged through respective diodes D7, D6, D5 and D4 and then through a thyristor SCR4 by way of transformers T2, T3, T4 and T5, and the xenon tubes Xe2 to Xe5 are accordingly fired simultaneously.

When, for example, the selector switch SW3 is engaged to an OFF position, the capacitor C6 is merely charged to a level corresponding to the voltage of MC divided by resistors R7 and R11, so that the xenon tube Xe2 will not be fired even when at this time the thyristor SCR4 is switched on. Thus, by selectively manipulating the switches SW3 to SW6, some or all of the xenon tubes Xe2 to Xe5 corresponding to the selected switches SW3 to SW6 can be controlled so as to fire.

Figure 13:
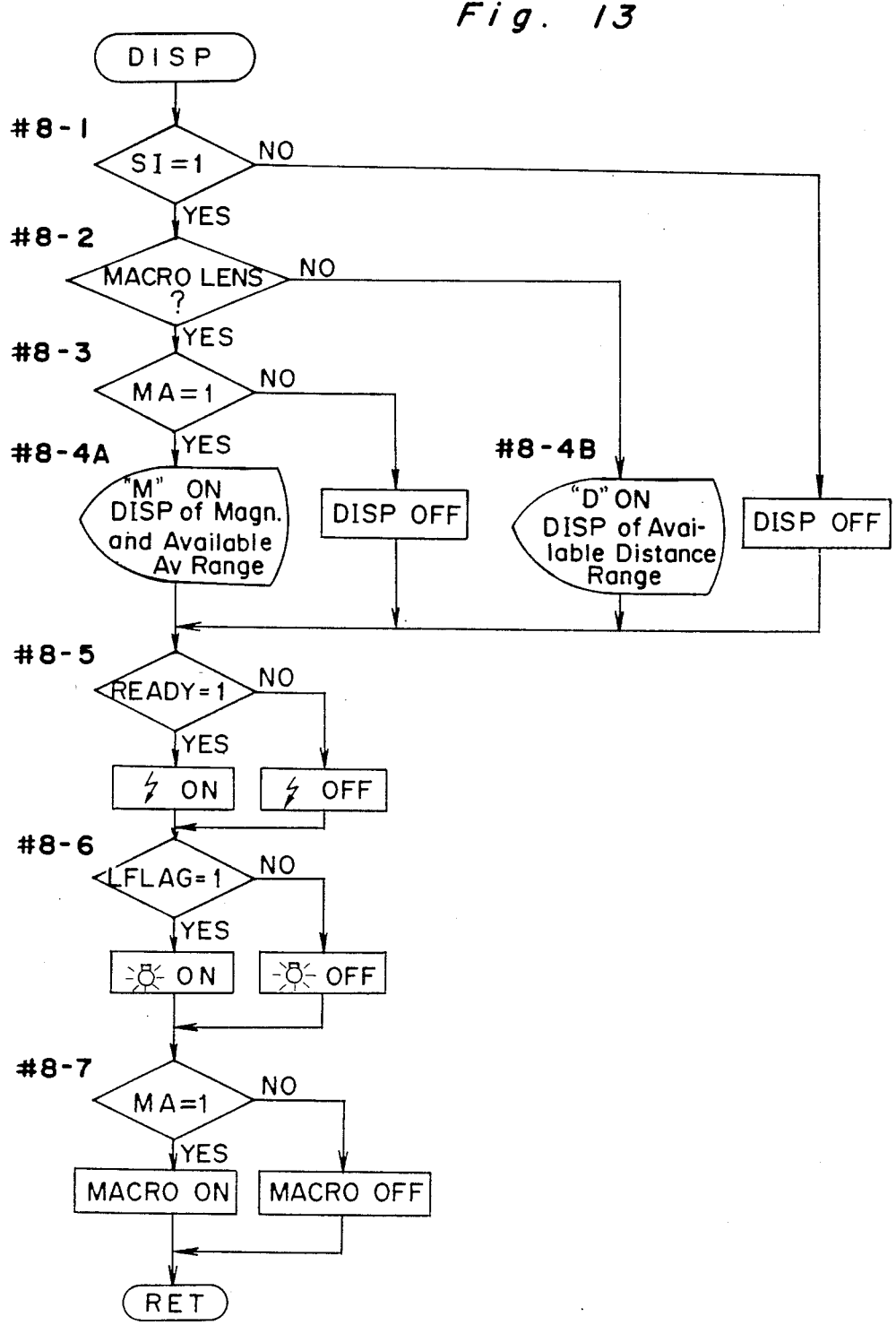
Figure 18:
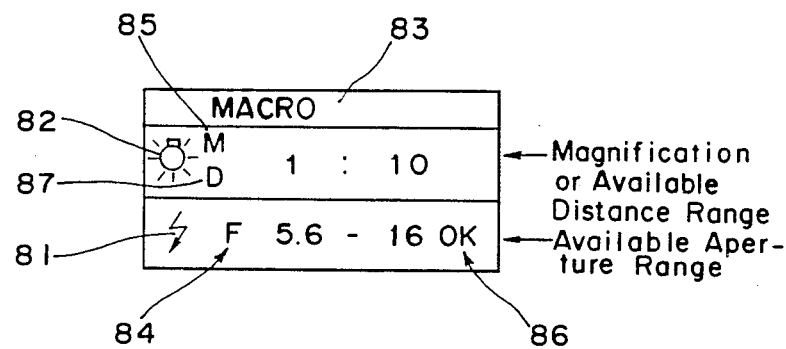
FIG. 18 is a diagram showing all of the parameters that are displayed in a display unit in the flash device.

FIG. 13 illustrates the display routine which will now be described in connection with an example of display shown in FIG. 18. At step #8-1, a decision is made to determine if the transmission of signals with the camera has taken place. If the signal transmission takes place, flag SI is rendered to be 1, followed by step #8-2, but if it does not take place, all of the displays are turned off.

At step #8-2, a decision is made to determine if the macro lens assembly is mounted in the light of the macro lens mounting signal. Should the macro lens assembly be mounted on the camera, the program flow proceeds to step #8-3, but should it be not mounted, a symbol "D" 87 for the display of a lighting distance or a flash available distance and the range of lighting distances flash available distances are displayed at step 8-4B.

At step #8-3, a decision is made to determine if the macro flash unit 6 is mounted on the flash device. If it is mounted, the terminal MA is rendered to be in a high level state with the program flow proceeding to step #8-4A. If it is not mounted, all of the displays are turned off. At step #8-4A, a symbol "M" 85 for the display of photomacrography, the magnification, the available aperture range and a symbol "OK" 86 for the display of the availability of the preset aperture are turned on. At step #8-5, a decision is made to determine if the main capacitor in the flash main body 1 has been completely charged, and if it has been completely charged, a symbol 81 (FIG. 13) for the display of the completion of the charging is turned on, but if it has not yet been charged, the display symbol 81 is turned off.

At step #8-6, a decision is made to determine if the lamp switch SW2 is switched on. If it is switched on, a lamp display symbol 82 is lit, but if it is not switched on, the symbol 82 is turned off.

At step #8-7, a decision is made to determine if the macro flash unit 6 is mounted. If it is mounted, a display 83 showing the mounting of the macro flash unit is lit, but if it is not mounted, it is turned off.

Figure 14:
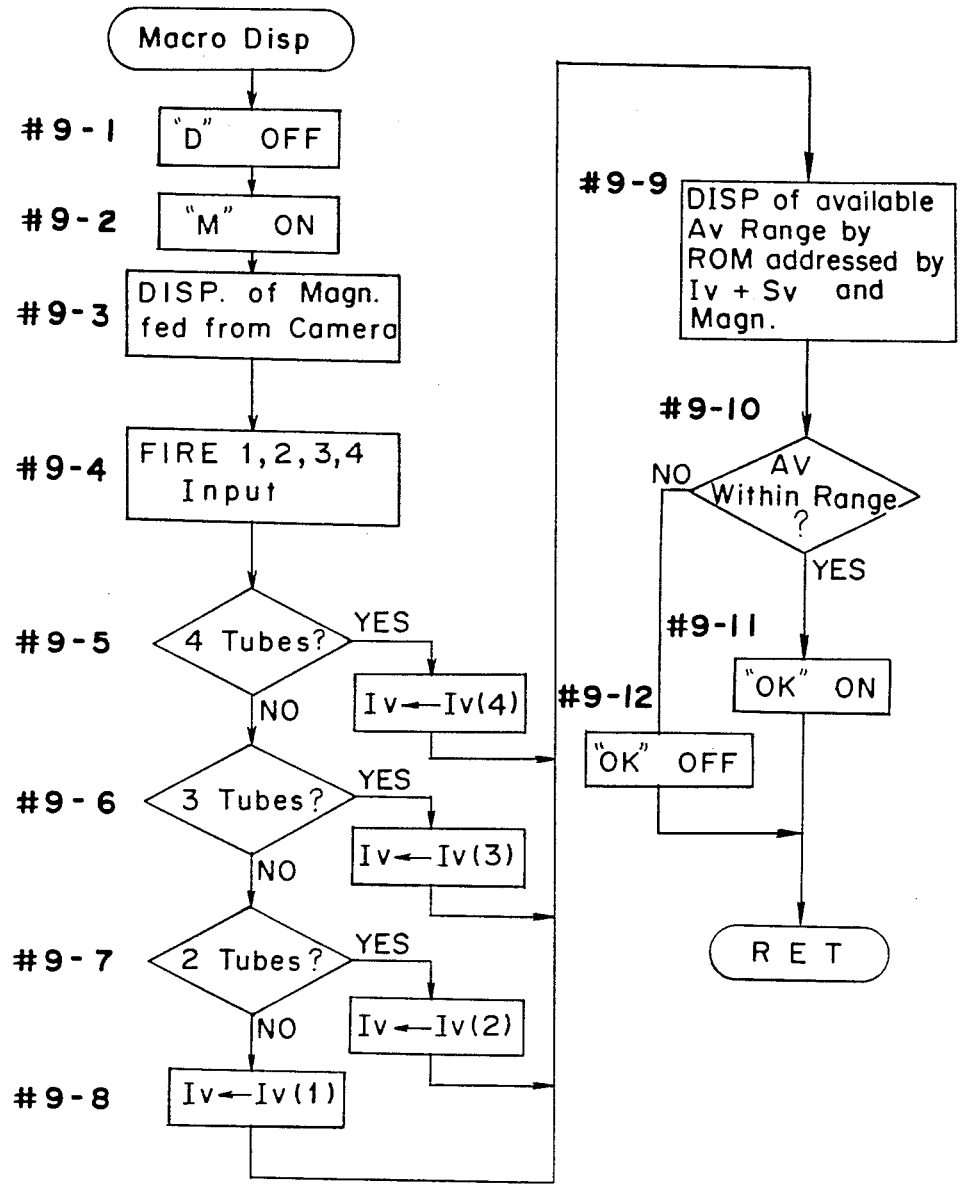

The details of the macro display which takes place at step #8-4A of the program flow of FIG. 13 are illustrated in FIG. 14, reference to which will now be made.

At step #9-1, the lighting distance display symbol "D" 87 is turned off, and at step #9-2 the macro display symbol "M" 85 is lit. At step #9-3, the magnification transmitted from the camera is displayed, followed by step #9-4 at which signals representative of the selective firing determined by the switches SW3 to SW6 are inputted from respective terminals FIRE 1, 2, 3 and 4. At step #9-5, a decision is made on the basis of the data inputted at step #9-4 to determine whether or not all of the xenon tubes Xe2 to Xe5 should be fired, and if all of the xenon tubes Xe2 to Xe5 should be fired, a light amount data Iv(4) is set as a light amount data Iv. Similarly, at step #9-6 a light amount data Iv(3) is set as the light amount data Iv where three xenon tubes are desired to be fired; at step #9-7 a light amount data Iv(2) is set as the light amount data Iv where two xenon tubes are desired to be fired; and at step #9-8 a light amount data Iv(1) is set as the light amount data Iv where only one xenon tube is desired to be fired. This is a correction applicable where the total flash amount varies with the number of xenon tubes.

At step #9-9, the range of available apertures determined on the basis of the sum of the light amount data Iv and the film sensitivity Sv, transmitted from the camera, and the magnification M are displayed (for example, 5.6 −16).

At step #9-10, a comparison is made between the current preset aperture value Av, transmitted from the camera, and the range of available aperture obtained at step #7-9. If the current preset aperture falls within the range of available aperture, a symbol "OK" 86 is lit at step #9-11, but if it does not, the symbol is turned off at step #9-12.

Figure 15:
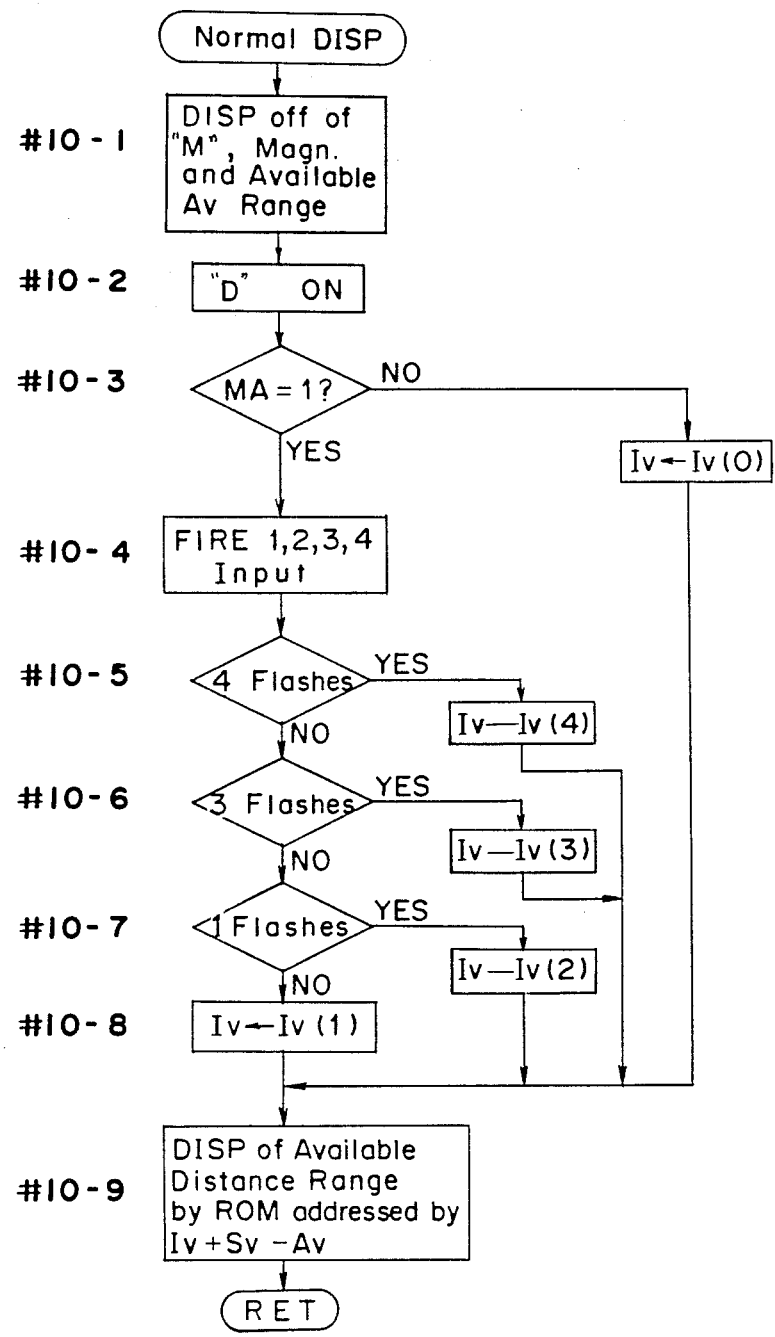

FIG. 15 illustrates the details of a routine for a normal display which takes place at step #8-4B of the program flow of FIG. 13.

At step #10-1, the macro display symbol "M" 85 is turned off. At step #10-2, the lighting distance display symbol "D" 87 is lit. At step #10-3, a decision is made to determine if the macro flash unit is mounted. If the macro flash unit is not mounted, a light amount data Iv(0) of a normal flash unit is used as the light amount data Iv, but if the macro flash unit is mounted, the light amount data corresponding to the selected numbers of the xenon tubes are successively inputted at steps 10-4 to #10-8 in respective manners as that at steps #9-4 to #9-8.

At step #10-9, the range of lighting reach determined on the basis of a calculated value of Iv+Sv−Av is displayed. It is to be noted that data of the range of the available aperture and the range of lighting reach are stored in the ROM beforehand and can be read out by specifying the address corresponding to the calculated value.

In the foregoing embodiment, the illuminator lamps are arranged such as shown in FIG. 3 and have been described as being turned on in response to the low level signal at the terminal LAOUT at step #4-7 shown in and described with reference to FIG. 9. However, the following alternative embodiment is possible within the framework of the present invention, which embodiment will now be described with reference to FIGS. 16 and 17.

Figure 17:
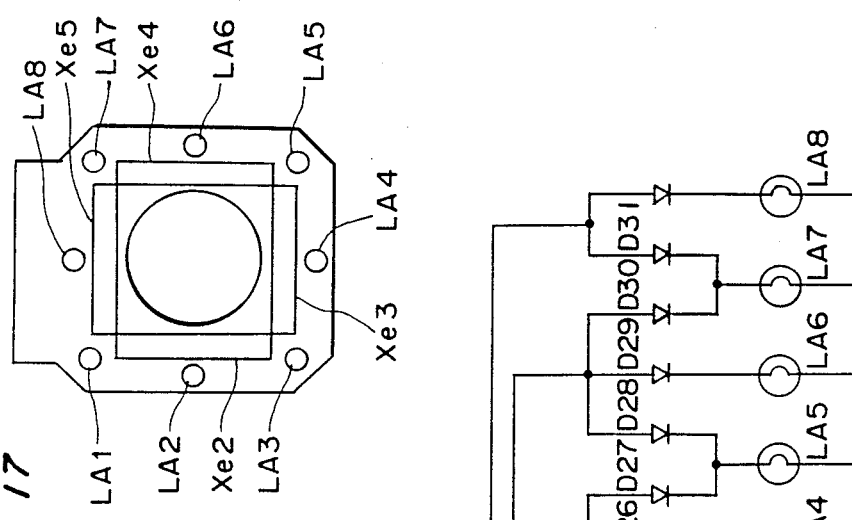
FIG. 17 is a front elevational view of a second embodiment of the macro lighting unit.
Figure 16:
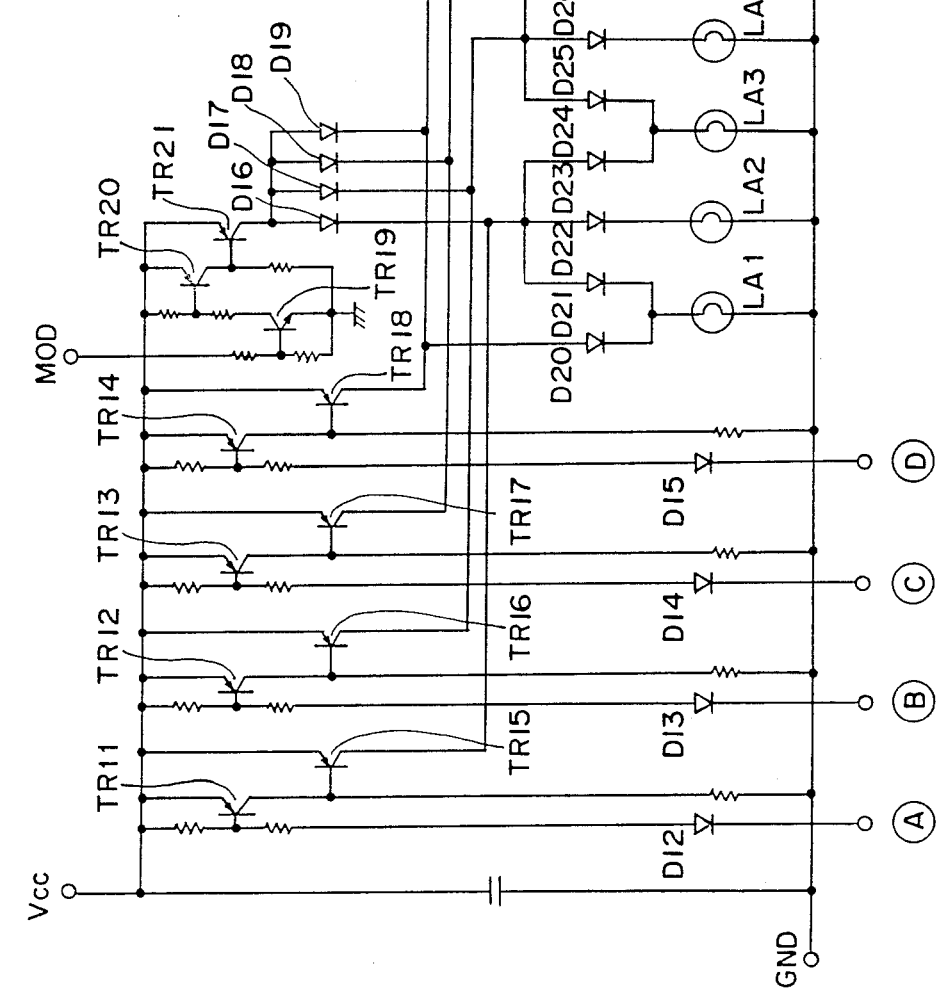
FIG. 16 is a circuit diagram showing the details of a lamp control circuit shown in FIG. 8.

The details of the lamp control circuit LC shown in FIG. 8a are shown in FIG. 16. A terminal Vcc is connected through the terminal t1-1, shown in FIG. 8a, with the transistor TR2 incorporated in the flash main body 1. The switch SW2 is of a two-line, three-contact type incorporated in the flash main body 1, one switch SW2-1 being connected with the microcomputer MCF while the other switch SW2-2 is connected with the lamp control circuit through a terminal t1-2. Each contact can be selectively switched over to any one of OFF, ILL and MOD positions. At the OFF position, no high level signal is outputted from the LAOUT terminal of the microcomputer MCF and therefore the illuminator lamps will not be lit. At any one of the ILL and MOD positions, the high level signal is outputted from the LAOUT terminal of the microcomputer MCF and, therefore, an electric power is supplied to the lamp control circuit LC through a transistor TR3 and then through a transistor TR2. It is to be noted that ILL stands for illumination and, in order to facilitate the framing and/or focusing during the photo-taking, all of the lamps LA1 to LA8 of the illuminator unit can be lit, and that MOD stands for modelling and only a group of lamps located at respective positions corresponding to the xenon tubes Xe2 to Xe5 can be lit so that, during the photo-taking, the formation of a shadow can be predicated. The lamps and the xenon tubes are so positioned relative to each other as shown in FIG. 17. As a matter of course, in front of these lamps and xenon tubes, a panel similar to that described in connection with the foregoing embodiment is disposed, respective portions of the panel frontwardly of the lamps having a light diffusion density smaller than that frontwardly of the xenon tubes.

The operation of the circuit shown in FIG. 16 will now be described. Assuming that the lamp lighting switch SW2 is in the ILL position, the electric power from a battery Ba is supplied through the transistor TR2. Since at this time a MOD terminal of the switch SW2-2 is opened, the MOD terminal shown in FIG. 16 is in a low level state and, therefore, transistors TR19 and TR20 are switched off. Accordingly, a transistor TR21 is switched on with the consequence that the voltage at the terminal Vcc is applied to the lamps LA1 to LA8 through the transistor TR21, then diodes D16 to D19 and finally through diodes D20 to D31, thereby to light all of the lamps LA1 to LA8.

When the switch SW2 is in the MOD position, the electric power from the battery Ba is supplied in the manner as hereinabove described and, at the same time, the potential at the MOD terminal of the switch SW2-2 becomes equal to the potential of the terminal Vcc. Because of this, both of the transistors TR19 and TR20 are switched on, the transistor TR21 switched off, and accordingly, the lamps LA1 to LA8 will not be lit through a circuit including this transistor TR21.

In such case, the lighting of the lamps is controlled by the selector switches SW3 to SW6. In other words, assuming that only the switch SW3 is switched on, only a terminal A is rendered to be in a high level state and terminals B to D are shortcircuited to GND and accordingly rendered to be in a low level state. Accordingly, in FIG. 16, a transistor TR11 is switched off and transistors TR12 to TR14 are switched on because it is connected with GND through diodes D13 to D15. In other words, since only the transistor TR15 is switched on, the electric power at the terminal Vcc causes the lamps LA1 to LA3 to be lit through the transistor TR15 and then through the diodes D21 to D23. Thus, since the lamps LA1 to LA3 arranged at respective positions equivalent to the position of the xenon tube Xe2 are lit, a modelling effect can be obtained with these lamps LA1 to LA3 acting as modelling lamps.

Where the xenon tubes other than the xenon tube Xe2 is selected depending on a combination of the switches SW3 to SW6, or where arbitrarily chosen two, three or four of these xenon tubes are selected, a similar description to that made above can equally apply.

The relationship between the selected xenon tubes and the lamps is shown in the following table.

| Lamps Lit | Selected Xenon Tube | | | |
| --- | --- | --- | --- | --- |
|  | Xe2 | Xe3 | Xe4 | Xe5 |
| LA1 | ON | OFF | OFF | ON |
| LA2 | ON | OFF | OFF | OFF |
| LA3 | ON | ON | OFF | OFF |
| LA4 | OFF | ON | OFF | OFF |
| LA5 | OFF | ON | ON | OFF |
| LA6 | OFF | OFF | ON | OFF |
| LA7 | OFF | OFF | ON | ON |
| LA8 | OFF | OFF | OFF | ON |

Figure 19:
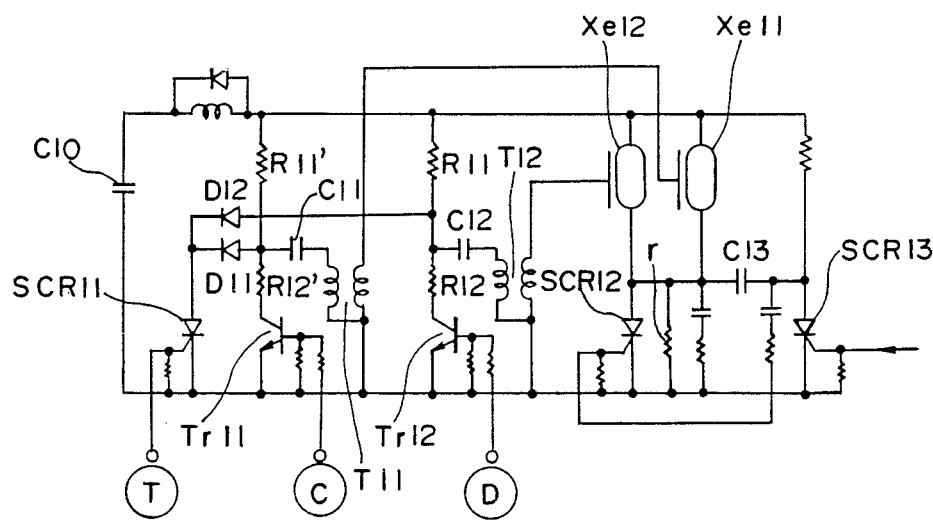
FIG. 19 is a circuit diagram showing an alternative form of a flash firing circuit.

The flash device shown in FIG. 8(a) can be modified as shown in FIG. 19. Referring to FIG. 19, reference characters Xe11 and Xe12 represent respective xenon tubes, and reference character C10 represents a main capacitor for storing an firing energy, which main capacitor is adapted to be charged to a predetermined voltage by a charging circuit not shown. Reference numerals C11 and C12 represent respective trigger capacitors connected at one pole to primary windings of respective trigger transformers T11 an T12 and at the opposite pole to a common discharge circuit through diodes D11 and D12. The discharge circuit is provided with a single thyristor SCR11. That poles of the trigger capacitors C11 and C12 which are connected with discharge circuit are connected to respective junctions between divider resistors R11 and R12 and between divider resistors R11, and R12', which resistors R11 and R12 or R11' and R12' act to divide the voltage charged on the main capacitor C10. A series circuit of the divider resistors R11 and R12 and a series circuit of the divider resistors R11' and R12' are connected respectively with transistors Tr11 and Tr12 which act as respective switching means, the base of each of said transistors Tr11 and Tr12 being adapted to receive an associated signal. These transistors Tr11 and Tr12 form the charge inhibiting means. More specifically, where the xenon tube Xe12 is desired not to be fired, a high level signal is to be applied to a terminal D and a terminal C is to be in a low level state. By so doing, the transistor Tr11 is switched off and the transistor Tr12 is brought into a conducting state. Because of this, the trigger capacitor C11 is charged to a voltage equal to that of the main capacitor C10, but the trigger capacitor C12 is charged to a voltage equal to the voltage of the main capacitor Co divided by the divider resistors R11 and R12, and accordingly, the voltage generated from the secondary winding of the transformer T12 when the capacitor C12 is discharged does not attain a value required to trigger the xenon tube Xe12 and the xenon tube Xe12 cannot be fired.

It is to be noted that, instead of the charged voltage on the main capacitor C10 divided by the resistors R11 and R12 and the resistors R11' and R12', resistors R11 and R11' may be directly connected with the transistors Tr11 and Tr12 respectively so that voltages charged on the respective trigger capacitors C11 and C12 can be zero when the transistors Tr11 and Tr12 are brought in conducting states. It is also to be noted that, instead of the transistors connected parallel to the trigger capacitors and the primary windings of the transformers, the transistors may be inserted in a charging circuit for the trigger capacitors to interrupt the charging current flow to the trigger capacitors.

In any event, the secondary winding of the trigger transformer T11 is connected with a trigger electrode of the xenon tube Xe11 and the secondary winding of the transformer T12 is connected with a trigger electrode of the xenon tube Xe12. To describe the case in which both of the xenon tubes Xe11 and Xe12 are simultaneously fired, both of the terminals C and D are, in such case, rendered to be in a low level state, and both of the trigger capacitors C11 and C12 are charged to a voltage equal to the voltage on the main capacitor C10. When a high level signal is applied to a terminal T during this condition, the thyristor SCR11 conducts, causing the trigger capacitors C11 and C12 to be discharged in phase with each other through the diodes D11 and D12 whereby high voltage impulses are simultaneously generated from the secondary windings of the respective transformers T11 and T12 with the xenon tubes Xe11 and Xe12 consequently fired simultaneously.

With respect to a circuit for the xenon tubes Xe1 and Xe12, the capacitor C13 is charged initially in plus polarity at a right end thereof to a voltage equal to the voltage of the capacitor C10. When either one of the xenon tube Xe11 and Xe12 is triggered, the voltage at an upper end of a resistor r increases and the increase of this voltage is transmitted to the gate of the thyristor SCR12 through the capacitor C13 to turn on the thyristor SCR12 with the consequence that the discharge of the xenon tube is continued. When a firing stop signal is subsequently applied to the gate of a thyristor SCR13, a left end of the capacitor C13 is drawn to a minus level because a right end of the capacitor C13 is brought to a low level, thereby turning off the thyristor SCR12 with the consequence that the discharge of the xenon tube is interrupted Where as hereinbefore described only one of the xenon tubes, for example, the xenon tube Xe11, is desired to be fired, the terminals C and D are to be rendered to be in low and high level state, respectively, and the charged voltage on the capacitor C12 is selected to be sufficiently lower than the charged voltage on the main capacitor C10. By so doing, even though the capacitor C12 is discharged as a result of conduction of the thyristor SCR11, no high voltage required to trigger the xenon tube is not generated from the secondary winding of the transformer T12 and the xenon tube Xe12 does not fire accordingly. In such case, the diodes D11 and D12 prevent the capacitors C11 and C12 from being charged to the same voltage which would occur as a result of transmission of the charged voltage on the capacitor C11 to the capacitor C12 during the charging of both of the capacitors C11 and C12, thereby to permit the capacitors C11 and C12 to be independently charged.

Hereinafter, outstanding features resulting from the construction according to any one of the foregoing embodiments of the present invention will be enumerated.

(1) Where the macro photo-taking is to be carried out with the macro flash unit mounted over the lens assembly, the front panel must have a high light diffusion density in order to avoid uneven flash lighting. If the illuminator lamps for illuminating the subject to facilitate the focusing and/or framing are disposed behind the front panel, the intensity of illuminating light utilized for the determination of the framing or the facilitation of the focusing tends to be lowered because of the front panel having the high light diffusion density. In order to facilitate the focusing and/or the determination of the framing, in the present invention, the illuminator lamps are disposed in the vicinity of the xenon tubes of the macro flash unit and the front panel adapted to be positioned frontwardly of them is designed so as to have portions having a light diffusion density smaller than that of portions thereof frontwardly of the xenon tubes. With this construction, a sufficient amount of illuminating light can be obtained at the time of focusing and/or framing and, therefore, the accurate focusing and/or determination of the composition can be accomplished.

(2) In the macro flash device wherein the macro flash unit capable of selectively firing the plural xenon tubes is mounted over the lens, the switch for the selection of the xenon tubes has hitherto been provided on the back face of the macro flash unit mounted on the lens assembly. In such case, since the lens assembly is brought close to the subject and is, because of the macro flash unit mounted thereon, unstable with respect to the center of gravity, the lens assembly tends to be unnecessarily moved during the manipulation of the switch with the focus and the framing changed consequently, requiring the focus and the framing to be re-adjusted. In order to obviate the above discussed inconveniences, in the present invention, the macro flash device is separated into the macro flash unit adapted to be mounted over the lens assembly, the control main body adapted to be mounted onto a hot shoe of the camera body, and a cable section for electrically connecting them together, the switch for the selective firing of the xenon tubes being disposed on the control main body. With this construction, the manipulation of the switch for the selective firing of the xenon tubes is carried on the side of the control main body on the hot shoe of the camera body, not at the front end of the lens assembly, and, therefore, any possible change of the focus and the framing which would occur during th manipulation of the switch can be substantially avoided.

(3) In the macro flash device, the switch for lighting the illuminator lamps for facilitating the focusing and/or framing is separately provided and the illuminator lamps are so designed as to be lit during a period in which the switch is switched on, or for a predetermined time subsequent to the switching on of the switch. In this arrangement, since the illuminator lamps consume a relatively great amount of electric power and, accordingly, it is desirable for the lamps to be lit only during a period in which the focusing and framing are carried out. Although improvement is more or less possible where the lamps are allowed to be lit only during the predetermined time, the lighting of the lamps subsequent to the completion of one or both of the focusing and the framing which has or have ended earlier than the predetermined time would result in the unnecessary consumption of the electric power. In order to obviate this inconvenience, i the present invention, there is provided a signal input section to which a signal corresponding to a manipulation to the camera such as depression of the shutter button is inputted from the camera, and a lamp lighting means for lighting the lamps during a period corresponding to this signal. It is, however, to be noted that the above described signal may be a signal corresponding to the depression of the shutter button, or a signal corresponding to the manipulation of an AE lock switch or the switching operation of a photo-taking mode of the camera. With this construction, since the lamps can be lit during the period corresponding to the manipulation such as depression of the camera shutter button (for example, during the period in which it is operated), the lamps can be turned off automatically to avoid unnecessary consumption of the electric power when a photographer ceases the manipulation upon the completion of the focusing and/or framing.

(4) In the macro flash device wherein the macro flash unit is mounted over the lens assembly, since the macro flash unit is too close to the optical axis of the lens assembly, a red-eye phenomenon in which the eyes of the subject are photographed as red tends to occur when it is used for flash photography at normal distance, and, therefore, the use thereof is limited. In such case, the use may be made of two flash devices one for use in photo-taking at a normal distance and the other for use in photomacrography or close-up photography, the use of these two separate flash devices increasing the weight of the system as a whole and rendering the system to be bulky. In order to avoid these inconveniences, in the present invention, the macro flash device borrows a power source unit in the normal flash device and, for this purpose, a portion of the macro flash device other than the power source unit is so designed as to be detachably connected through a connector with the normal flash device while the normal flash device is mounted on the camera body. With this construction, the macro flash unit need not be provided with its own electric power source and, therefore, the system can be reduced in weight and size in the event that the photomacrography or close-up photography and the normal flash photography are selectively carried out.

(5) During close-up photography or photomacrography, the effective aperture of the lens assembly varies with the magnification. Therefore, when the close-up photography or photomacrography is carried out with the use of the macro flash device, the necessity arises to determine if a desired or calculated aperture value falls within the range of available apertures. In other words, it has been required to read the magnification from calibrations on a lens barrel of the macro lens assembly after the subject has been focused, then read the range of available aperture in the light of the chosen magnification, and finally select a particular aperture value from the available aperture range. In order to avoid the necessity of such complicated procedures and also to facilitate the determination of whether or not the desired or calculated aperture value falls within the available aperture range, in the present invention, the macro flash device is provided with an input means for inputting data on the magnification, the film sensitivity and the aperture value from the camera body, a calculating means for calculating the available aperture range in the light of these data and data on the amount of flash light, and a display mans for displaying the calculated range of available aperture values. With this construction, since the available aperture range can be automatically displayed, such complicated procedures as reading the magnification which have been hitherto required can be obviated.

(6) Where the photomacrography or close-up photography under close-range flash lighting and the normal photography under flash lighting are made to be selectively carried out, it is necessary to select a flash unit according to which one of them is to be carried out. In such case, it may be contemplated to select the flash unit with the use of a selector switch, the switching effected by the selector switch tends to be accompanied by an erroneous operation or a photographer may fail to do so, and also it may happen that the normal flash unit may be fired during the close-range photo-taking or the macro flash unit may be fired during the normal photo-taking, resulting in the incorrect photo-taking taking place. In order to obviate these problems, in the present invention, the macro flash unit is so designed as to be selectively removable relative to the normal flash unit while borrowing the power source thereof and is provided with a discriminating means for determining whether or not the macro flash unit has been mounted, and an inhibiting means for inhibiting the firing operation of the normal flash unit when the mounting of the macro flash unit has been determined. With this construction, since the firing operation of the normal flash unit can be automatically inhibited when the macro flash unit has been mounted, not only is the necessity of the selector switch obviated, but also any failure to operate the selector switch does not occur.

(7) The provision of the macro flash unit, including a plurality of xenon tubes capable of being selectively fired, with illuminator lamps for illuminating the subject facilitating the focusing and/or framing is disclosed in, for example, in the Japanese Laid-open Utility Model Publication No. 60-39025. In this case, the illuminator lamps are used to illuminated the subject uniformly irrespective of the selection of the xenon tubes and it has been impossible to predicate what type of shadow due to the firing of the selected xenon tubes would result in. In order to enable the predication of what type of shadow due to the firing of the selected xenon tubes would result in, in the present invention, a plurality of illuminator lamps are disposed in correspondence with the xenon tubes to be selected so that the distribution of light produced by the illuminator lamps can substantially match with that by the selected xenon tubes, and, at the same time, the embodiment of the present invention is provided with means for determining which one of the xenon tubes is selected, and a selectively lighting means for selectively lighting the illuminator lamps according to the result of the determination. With this construction, since the illuminator lamps corresponding to the selected xenon tubes are selectively lit, illumination in a pattern of distribution of light similar to that exhibited by the selected xenon tubes can be obtained and it can be predicated what type of shadow due to the firing of the selected xenon tubes would result in, thereby being convenient in the case where the xenon tubes are to be selected during the close-range photo-taking.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A close-range lighting flash device for use in a camera, which device comprises:

a macro flash unit including a plurality of xenon tubes and adapted to be mounted over a photo-taking lens of said camera;

a control unit separated from said macro flash unit and adapted to be mounted on the camera body, said control unit including a selecting means manually operable for selecting which if said xenon tubes are to be fired and outputting to said macro flash unit a selection signal for the selective firing of said xenon tubes; and a cable section for electrically connecting said macro flash unit and control unit and transmitting the selection signal to aid macro flash unit.

2. A close-range lighting flash device as claimed in claim 1, wherein said macro flash unit further includes a plurality of illuminator lamps disposed in correspondence with said xenon tubes, and said selecting means further includes means for selecting said illuminator lamps in response to the selection signal such that the distribution of light produced by selected illuminator lamps substantially matches with that produced by selected xenon tubes.

3. A close-range lighting flash device as claimed in claim 2, wherein said control unit further includes a power supply for supplying a power to both of said xenon tubes and illuminator lamps.

4. A close-range lighting flash device as claimed in claim 3, wherein said control unit further includes means for inputting signals from said camera, said signals including a signal for designating the firing of said xenon tubes produced in response to an exposure operation of said camera and a signal for designating the illumination of said illuminator lamps produced in response to a manual operation to said camera, and means for firing and illuminating said xenon tubes and illuminator lamps in response to the corresponding signals, respectively.

5. A close-range lighting flash device as claimed in claim 2, wherein said macro flash unit further includes a light-transmitting panel arranged in front of both of said xenon tubes and illuminator lamps and having first portions aligned with the respective xenon tubes and second portions aligned with respective illuminator lamps, said second portions of the light-transmitting panel having a light diffusing density smaller than that of the first portion of the same light-transmitting panel and said first portions and second portions being integrally molded in said panel.

6. A close-range lighting flash device as claimed in claim 1, wherein said macro flash unit comprises trigger circuits one for each xenon tube, each trigger circuit including a trigger capacitor, a discharge circuit including a single switching means and commonly connected with all of said trigger capacitors and a charge inhibiting means provided for each or some of said trigger capacitors for inhibiting the charging operation of corresponding trigger capacitor in accordance with the selection signal.

7. A close-range lighting device as claimed in claim 1 further including a normal flash unit integrally mounted in the control unit and operative independent of the macro unit.

8. A close-range lighting device as claimed in claim 7 further including means for inhibiting the firing of the normal flash unit when the mounting of the macro flash unit has been established.

9. A close-range lighting device as claimed in claim 7 further including a single power source for both the macro flash unit and the normal flash unit mounted in the control unit.

10. A close-range lighting flash device which comprises an electronic flash unit including a plurality of xenon tubes, an illuminator unit provided integrally in the flash unit and including a plurality of illuminator lamps, a light-transmitting panel arranged in front of both of the xenon tubes and the illuminator lamps, and a control device for energizing the illuminator unit, said light-transmitting panel having first portions aligned with the respective xenon tubes and second portions aligned with respective illuminator lamps, said second portions of the light-transmitting panel having a light diffusing density smaller than that of the first portion of the same light-transmitting panel and said first portions and second portions being integrally molded in said panel.

11. A flash device comprising:
a plurality of xenon tubes;
a selecting means manually operable for selecting said xenon tubes to be fired and outputting a signal for the selective firing of said xenon tubes;
a plurality of trigger circuits having an equal number of said xenon tubes and capable of triggering each xenon tube, each trigger circuit including a trigger capacitor for charging an energy for the firing;
a discharge circuit commonly connected with all of said trigger capacitors and including a single switching means for discharging said trigger capacitors and thereby triggering said xenon tubes; and
a charge inhibiting means for inhibiting the charging of corresponding trigger capacitor in accordance with the selection signal.

12. A flash device as claimed in claim 11 further including a main control body adapted to be mounted on a camera body and having a normal flash unit and a macro flash unit adapted to be mounted about a lens element attached to the camera body and means for electrically connecting the macro flash unit to the main control body, the xenon tubes are mounted on the macro flash unit and the single switching means is mounted on the main control body.

13. A flash device as claimed in claim 12 further including means for inhibiting the firing of the normal flash unit when the mounting of the macro flash unit has been established.

14. A flash device as claimed in claim 13 further including a single power source capable of energizing both the normal flash unit and the macro flash unit, the power source being mounted within the main control body.

15. A flash device as claimed in claim 12 wherein the means for electrically connecting includes a flexible cable.

* * * * *